United States Patent [19]

McNamara et al.

[11] Patent Number: 4,533,948

[45] Date of Patent: Aug. 6, 1985

[54] CATV COMMUNICATION SYSTEM

[75] Inventors: Robert P. McNamara; Gregory B. Ennis, both of San Jose; Richard J. Feiertag, Sunnyvale; Robert K. Bauer, Fremont, all of Calif.

[73] Assignee: General Instrument Corporation, New York, N.Y.

[21] Appl. No.: 373,765

[22] Filed: Apr. 30, 1982

[51] Int. Cl.³ .............................................. H04N 7/16
[52] U.S. Cl. .................................. 358/122; 358/86; 358/114; 455/5; 340/825.5; 375/2.1
[58] Field of Search .................... 358/114, 122, 86; 375/2.2, 2.1; 340/825.5; 364/200, 900; 178/22.01, 22.02, 22.03, 22.04, 22.05, 22.06, 22.07, 22.08, 22.09, 22.10, 22.11, 22.12, 22.13, 22.14, 22.15, 22.16, 22.17, 22.18, 22.19; 455/5, 6, 3

[56] References Cited

U.S. PATENT DOCUMENTS

| | | | |
|---|---|---|---|
| 3,423,521 | 1/1969 | Friesen | 178/5.6 |
| 3,668,307 | 6/1972 | Face | 358/86 |
| 3,750,022 | 7/1973 | Currey | 325/53 |
| 3,786,424 | 1/1974 | McVoy | 340/151 |
| 3,798,605 | 3/1974 | Feistel | 178/22.08 |
| 3,803,491 | 4/1974 | Osborne | 325/53 |
| 3,859,596 | 1/1975 | Jannery | 325/31 |
| 3,934,079 | 1/1976 | Barnhart | 178/5.1 |
| 3,943,447 | 3/1976 | Shomo, III | 325/308 |
| 3,997,718 | 12/1976 | Ricketts | 178/6.8 |
| 4,031,543 | 6/1977 | Holz | 358/86 |
| 4,041,398 | 8/1977 | Ellis | 325/308 |
| 4,245,245 | 1/1981 | Matsumoto | 358/122 |
| 4,310,720 | 1/1982 | Check, Jr. | 178/22.08 |

Primary Examiner—Robert L. Griffin
Assistant Examiner—Timothy K. Greer
Attorney, Agent, or Firm—Allan J. Jacobson

[57] ABSTRACT

A two way digital communication arrangement utilizes a CATV system to provide bidirectional data transport service between any two points within the CATV system. The headend receives an upstream message and selectively rebroadcasts such message on the downstream portion of the spectrum. System intelligence is thus distributed throughout the system as server and subscriber nodes can be located anywhere in the CATV network. In order to obtain access to the CATV communication resources, user equipment at each node must attach a frame verifier (FV) code to each respective message. The headend examines the FV and permits rebroadcast of messages only if the FV code indicates that the user is authorized.

11 Claims, 17 Drawing Figures

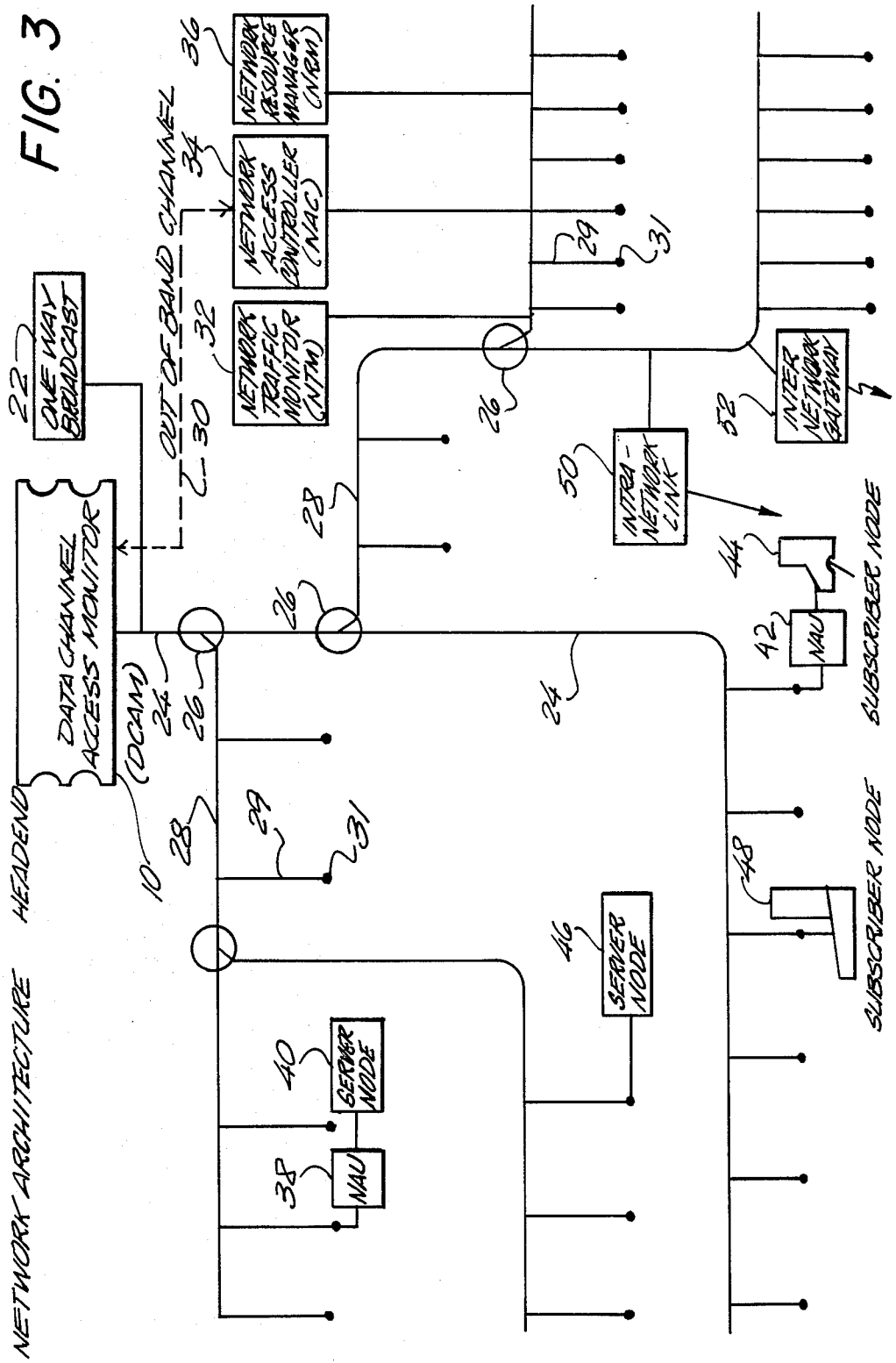

FRAME FORMAT-LINK LAYER

CONTROL FIELD          OTHER FIELDS

DATA                   FS, FV, DATA FOR HIGHER LAYER
CHANNEL REQUEST        ------
CHANNEL RELINQUISH     FS, FV,
CHANNEL GRANT          FS, FV, CHANNEL ACCESS CODE
CHANNEL DENIAL         FS, FV, REASON FOR DENIAL

CATV COMMUNICATION SYSTEM

FIELD OF THE INVENTION

This invention relates to digital communication utilizing a two way cable television (CATV) network.

BACKGROUND OF THE INVENTION

Two way CATV systems are well known. Techniques for utilizing the bidirectional nature of such networks for digital data transmission have been developed. For example see U.S. Pat. No. 3,803,491 to Osborn and U.S. Pat. No. 4,245,245 to Matsumato et al. A wide variety of consumer services such as home banking, electronic mail and newspapers, shop at home, and the like, are envisioned to become commonplace.

However, the systems developed to date have failed to achieve widespread use. One of the reasons for the lack of general acceptance is that prior art systems centralize digital communication at the headend of the CATV system. That is digital messages are exchanged between the headend and the user nodes. Such concentration of network intelligence at the headend node has several disadvantages.

Firstly, a centralized network design requires that many participants, particularly the cable operator, the service provider, and the equipment manufacturer, undertake coordinated activities simultaneously to assure that equipment and data formats are compatible. The reluctance of each individual party to act until a settled system architecture emerges has been an important factor in the delayed development of two way CATV data services. Also, a centralized network architecture results in complex and cumbersome headend equipment. The headend software in such prior art systems is typically multi-tasking in order to process different data services simultaneously. Therefore, adding new services to existing services can be difficult. Furthermore, as entirely new services are added to the system, the capability of a centralized system may be exceeded, requiring that the entire headend architecture be redesigned to accommodate all of the desired services.

Furthermore, system reliability is compromised when system intelligence is centralized: A single failure at the headend can disable all of the two way CATV services.

Finally, in a centralized system, the cable system operator is closely involved with the service providers and is burdened with such problems as information privacy, data integrity and disputes over rights of access to consumers by competing service providers.

SUMMARY OF THE INVENTION

The present invention is embodied in a decentralized communication arrangement wherein a node originating a message (a source node) and a node receiving a message (a destination node) can be located at any respective points in the CATV system.

In accordance with one aspect of the present invention a source node transmits a message towards the headend in the upstream portion of the cable spectrum. The headend selectively rebroadcasts the upstream message in the downstream portion of the cable spectrum, thus providing an arrangment whereby a source node is able to transmit a message to a destination node, wherever located.

The CATV communication network is deployed to the general public. Therefore, another aspect of the present invention includes a mechanism by which the access to CATV communication resources is controlled so that unauthorized users are denied access and authorized users are granted access. In accordance with the latter aspect of the present invention, a source node further transmits a verification message, referred to herein as a frame verifier (FV) code, as part of the upstream message.

In accordance with yet another aspect of the present invention, the headend apparatus examines the frame verifier code and rebroadcasts the received upstream message in the downstream portion of the cable spectrum only if the frame verifier code indicates that the source node is an authorized user thereby granting the user access to the CATV resources. Conversely, the headend apparatus does not rebroadcast the upstream message if the frame verifier message indicates that the source node is not an authorized user thereby denying the user access to the CATV resources.

ADVANTAGES OF THE PRESENT INVENTION

As previously stated, centralized network designs have not been widely established, in part because such designs require many participants to undertake coordinated activities simultaneously. Using the present invention, the CATV system operator can provide transparent data transport service, which data transport service can in turn be utilized by individual entreprenturs, or the CATV operator, to provide specific value added services.

Therefore, a communication arrangement embodying the present invention provides for decentralized system intelligence. System growth at the headend or at the nodes is modular, following either rapid or slow development of the overall system. In other words, the CATV system operator can establish a communication system offering defined interfaces for transparent data transport service at the user nodes. The channel capacity of the headend may be expanded, but its architecture (both hardware and software) remains the same as the overall system develops. The further development of various consumer services and information appliances, both of known types, and of those yet to be invented, can continue at the node interfaces, and without further architectural changes at the headend.

Decentralized network intelligence in accordance with the present invention results in less complex headend equipment. The headend can be initially equipped with a few data channels. Additional data channel capacity can be easily added as the communication data traffic load increases.

New services are readily accommodated in the present system by adding equipment at the server nodes which may be located anywhere in the network. For example, a new server node for electronic funds transfer can be located at the bank providing such service.

Although the complexity of each server node depends on the complexity of the specific service, server node software will generally be simplified (compared to a centralized system) due to the single task nature of a single service.

System reliability is enhanced by use of the present invention because equipment failure at one server node affects only that service and does not interrupt the services provided by the remaining server nodes. Similarly, a heavy data traffic load for one service does not substantially effect the service response time of the other server nodes.

Finally, a decentralized intelligence communication system tends to disassociate the CATV operator from the service provider. Issues involving information privacy and data integrity become the responsibility of the service vendor. The CATV operator simply offers transparent data transport service to be used as desired by the service provider.

BRIEF DESCRIPTION OF THE DRAWINGS

FIG. 2 is a is a block diagram of the modem portion of a subscriber terminal unit including a network access unit;

FIG. 3 is a block diagram illustrating a CATV communication system embodying the present invention;

DESCRIPTION OF AN EMBODIMENT OF THE INVENTION

A typical CATV system is capable of propagating a range of signal frequencies, for example, from 5 MHZ to 400 MHZ. Signal frequencies above 50 MHZ are reserved for distributing signals from the headend to the subscriber terminals (i.e. in the downstream or forward direction). Signal frequencies below 50 MHZ are reserved for propagating signals from individual subscriber terminals to the headhead (i.e. in the upstream or return direction).

Figure 1:
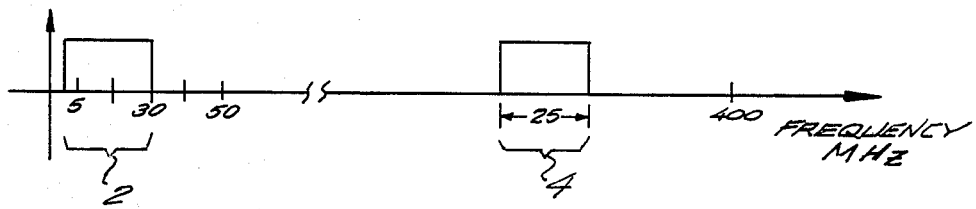
FIG. 1 is a graphical representation of bandwidth allocation in a two way CATV system.

A bandwidth allocation for use in conjunction with the present invention is graphically illustrated in FIG. 1. The upstream band 2 is 25 MHZ wide and extends from 5 MHZ to 30 MHZ. The downstream band 4 is also 25 MHZ wide and may be selected from any convenient band of frequencies in the downstream portion of the frequency spectrum.

The topology of a typical CATV system is that of an inverted tree. The headend is at the top of the inverted tree and the subscriber terminals are located throughout the trunk and branches. A signal from the headend in the forward direction is heard by all subscriber terminals. However, a signal transmitted from an individual subscriber terminal in the return direction is heard only by that portion of the other subscriber terminals that are in the signal propagation path from the transmitting subscriber terminal to the headend. Therefore, the signal transmitted from a particular subscriber terminal is heard by only a portion of the other subscriber terminals.

In accordance with the present invention, each signal frequency in the return band 2 is paired with a corresponding signal frequency in the forward band 4. The headend includes apparatus for receiving the return signal in the upstream band, and selectively rebroadcasting the signal at a higher corresponding frequency in the forward band. In such manner, a signal from an individual subscriber terminal (in the return band) is heard by all the other subscriber terminals (in the forward band) thereby permitting any individual subscriber terminal to transmit a message to any other subscriber terminal within the CATV system.

Digital signals are transmitted in the present system by the use of frequency shift keyed (FSK) modulation. A digital signal has one of two binary logic states, i.e. 1 or 0. When the digital signal is at a logical 1, an FSK modulator transmits a signal of first frequency and when the binary signal is at a logical 0, an FSK modulator transmits a signal at a second frequency. Similarly an FSK demodulator is responsive to an FSK signal to reproduce the original digital signal.

Figure 2:
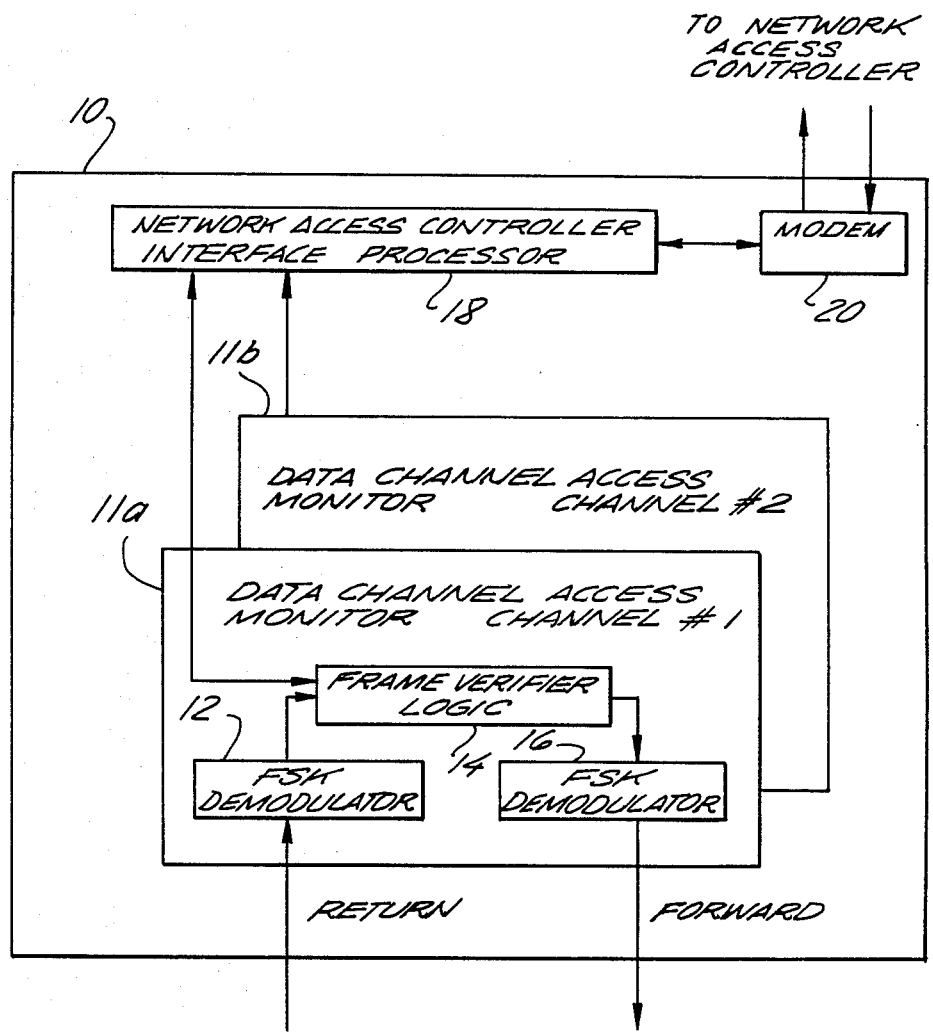
FIG. 2 is a block diagram of headend apparatus embodying the present invention.

A headend apparatus in accordance with the present invention is shown in FIG. 2. A data channel access monitor (DCAM) 10 comprises individual data channel access monitor modules 11a, 11b, etc., a network access controller interface processor 18 and a modem 20. An individual data channel access monitor module 11a comprises FSK demodulator 12, frame verifier logic 14, and FSK modulator 16. The FSK demodulator 12 is tuned to a particular frequency in the return band. The FSK modulator 16 is tuned to a corresponding paired frequency in the forward band. The frame verifier logic 14 examines the received data and selectively connects the output of the FSK demodulator 12 to the input of the FSK modulator 16. The FSK modulator 16 rebroadcasts the received signal in real time at a corresponding higher frequency in the forward portion of the cable spectrum. The frame verifier logic 14 also interfaces with the network access controller interface processor 18 which provides two way communication to the network access controller via modem 20. The operation of the frame verifier logic 14 will be described in more detail in conjunction with the description of FIG. 8.

Figure 2A:
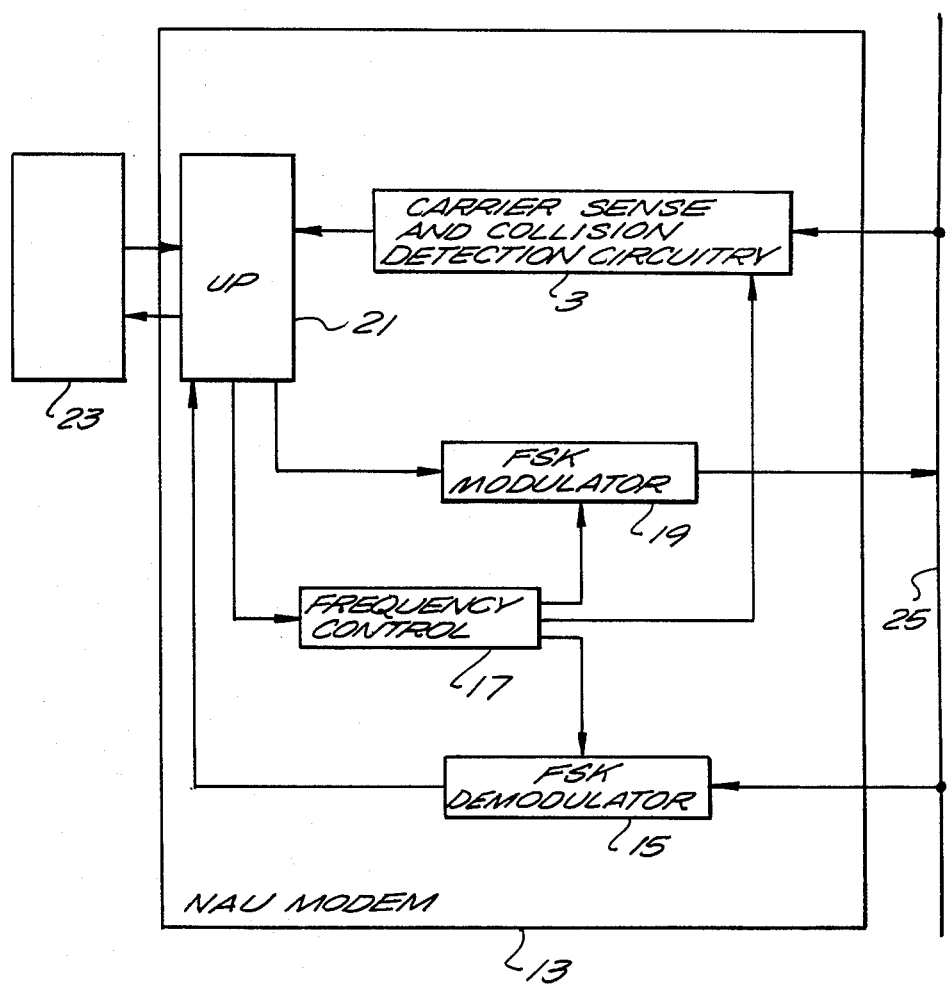

The modem portion of a subscriber terminal apparatus in accordance with the present invention is shown in FIG. 2a. A network access unit modem 13 comprises an FSK modulator 19, an FSK demodulator 15, carrier sense and collision detection circuitry 3, frequency control 17 and a microprocessor 21.

In operation, a digital signal from a source 23 is received by microprocessor 21. Microprocessor 21 formats the digital data into a frame message and includes a frame verifier (FV) code (described in conjunction with the detailed description of FIG. 7) as part of the frame message format. The frame message is applied to FSK modulator 19 which transmits the frame message as an FSK signal on cable 25 in the upstream direction to the headend.

At the headend 10 (FIG. 2), FSK demodulator 12 receives the encoded frame message. The frame message is examined in frame verifier logic 14. If the received frame verifier (FV) code indicates that the user is unauthorized, the frame verifier logic 14 blocks the further transmission of the frame message. However, if the frame verifier code indicates that the user is authorized, then the frame verifier logic continues to apply the frame message to FSK modulator 16 which transmits (rebroadcasts) the frame message in real time as an FSK signal in the downstream direction from the headend 10 to all subscriber terminals.

The frame message is received by a network access unit (NAU) modem similar to the NAU modem 13 in FIG. 2a. FSK demodulator 15 receives the rebroadcast frame message (FV) and forwards the received data to microprocessor 21. Note that the FSK demodulator 15 permits the NAU modem to monitor its own transmission as well as receive data from other network access units.

In order to share CATV communication resources among many users, the allocated return spectrum space is divided in 80 FSK data channels, each capable of transmitting 128 Kb/s. The forward spectrum space is similarly divided into 80 FSK data channels, forming 80 channel pairs in the system. However, a CATV system may have as little as one DCAM module 11a (FIG. 2). As the data traffic load increases, the CATV system operator may increase capacity by adding additional modules 11b, etc. Thus, communication capacity is increased without architectural changes at the headend.

Each subscriber terminal NAU is assigned a home channel. Naturally, for two subscriber units to communicate they must both be on the same data channel. Therefore, each NAU modem is frequency agile, i.e. able to change its upstream transmitting frequency (and its corresponding downstream receiving frequency) upon command from a system control computer called a network resource manager.

Furthermore, the present system permits many users to share the same data channel. Channel sharing is achieved by a technique known to those skilled in the art as carrier sense multiple access with collision detection (CSMA/CD).

Briefly, CSMA/CD is a contention mechanism by which many users share a common data channel. All users monitor the data channel to sense a carrier signal. A user node that desires to transmit a message waits until the channel is clear, and then transmits its message on the data channel. In the event that two users attempt to transmit at the same time, a collision occurs. The collision is detected by the users that have attempted to transmit. Each user then waits a random length of time before attempting to retransmit its respective message.

A CATV system embodying the present invention is shown in FIG. 3. Such system comprises a headend including conventional one way CATV broadcasting equipment 22 which provides regular video programming material to all subscribers. The signal distribution path includes trunk cables 24, distribution amplifiers 26, feeder lines 28, and ultimately drop lines 29 to individual system nodes 31.

There are several types of individual system nodes. User nodes are nodes where access to CATV communication resources is provided. Of the user nodes, there are two types: server nodes 46 (for service providers) and subscriber nodes 48 (for service consumers). Another type of system node is a control node, where control over the CATV communication system (e.g. network access control, billing for communication service, etc) is provided. Finally, there are network nodes including a link node 50 for communication between CATV networks, and a gateway node 52 for communication between the CATV network and foreign networks, such as the switched public telephone network.

A server node 40 communicates with a subscriber node 44 through respective network access units (NAU) 38 and 42. In such cases, the CATV system provides basic data transport service so that the CATV system appears transparent to the server 40 and subscriber 44. For example, the service provider can provide an asynchronous RS-232 server node apparatus 40 and a compatible asynchronous RS-232 subscriber node apparatus 44.

A server node 46 and a subscriber node 48 may incorporate (in addition to a respective NAU) a higher level of communication service such as a full videotex implementation including graphics capability. In such case, the server node 46 need only provide a videotex compatible application service. The subscriber node 48 hardware (and software) can thus be utilized by many different service providers.

System control nodes comprise a data channel access monitor (DCAM) 10 at the headend, a network access controller (NAC) 34, a network resource manager (NRM) 36, and a network traffic monitor (NTM) 32. System control nodes communicate over the CATV system in the same manner as subscriber and server nodes. In addition there is a two way, out of band data channel 30 between the NAC 34 and the DCAM 10. Messages on the out of band channel 30 between the NAC 34 and the DCAM 10 are not generally broadcast on the CATV network. Also, system control nodes 34, 34, and 36 may be located anywhere within the CATV system, except for the DCAM 10 which is located at the headend.

The network access controller (NAC) 34 is a specially programmed computer. The primary function of the NAC 34 is to grant or deny network access to user nodes. When network access is granted, a channel access code (CAC) is provided to the user node. When network access is denied, a reason is provided (e.g., channel busy, etc.) to the user node. The generation and transmission of channel access codes is described in conjunction with the description of FIG. 6.

The network resource manager (NRM) 36 is another specially programmed computer. An important function of the NRM 36 is to allocate communication resources among the various users. One way this is achieved is by load leveling, ie by retuning the individual user modems (FSK modulator and FSK demodulator) so that the data traffic load is more evenly distributed among the available data channels.

A second important function of the NRM 36 is to provide a directory look up service for user nodes. That is, the NRM 36 maintains a listing of currently assigned data channel frequencies (i.e. the original home channel frequency or a reassigned channel frequency) of each user node, as well as the address and symbolic name of that node. Thus, as will be further detailed in following descriptions, a user node can obtain the address and data channel frequency of a desired destination node by opening a communication session with the NRM 36.

The network traffic monitor (NTM) 32 is a third specially programmed computer. The NTM 32 is a passive information collector that listens on all data channels and collects information of usage of CATV communication resources. The information collected has two primary uses: (1) Billings for data communication service are generated during non-peak traffic hours, and (2) channel traffic statistics are provided to the NRM 36 for purposes of traffic management in allocating CATV bandwidth, i.e. load leveling.

Figure 4:
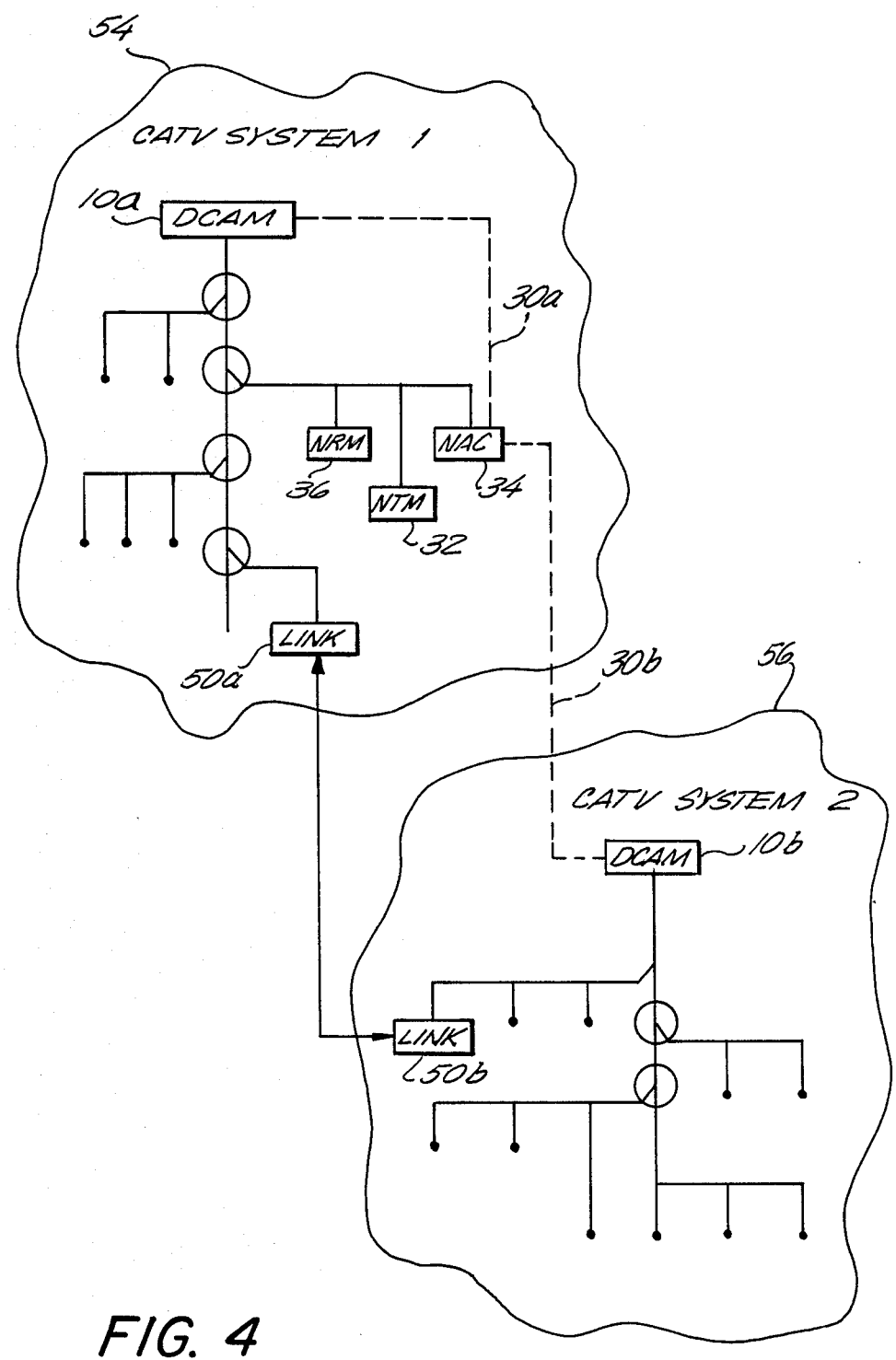
FIG. 4 is a block diagram illustrating two CATV systems linked together in a CATV communication system embodying the present invention.

A link node 50 provides intra-network communication between two CATV networks to form a single address space for CATV digital communication. As shown in FIG. 4, two CATV networks 54 and 56 are interconnected by link nodes 50a and 50b. One CATV system 54 includes DCAM 10a NRM 36, NTM 32 and NAC 34. The other CATV system includes DCAM 10b.

In its simplest form, links 50a and 50b perform one to one mapping of specific messages between CATV system 54 and 56. Link 50a receives downstream data. The received data is applied to link 50b which in turn retransmits the data in the upstream direction in CATV system 56. Thus, by the use of link nodes 50a and 50b the CATV system 54 and the CATV system 56 form a single data network having a common address space in which any node from either system may communicate with any other node.

Within a single CATV data network, each node is assigned a unique 24 bit address. Messages that are intended for reception by a particular destination node, contain the address of the destination node. All nodes monitor at least one data channel. When the address of the destination node is recognized, the whole message is received for further processing.

In addition to the address of a particular node, each node is assigned a secret 56 bit number called a node key. The node key is a security measure designed to prevent unauthorized users from obtaining access to CATV communication resources. Unlike the node address, the node key is never transmitted on the CATV system. Furthermore, the number of possible node keys, $2^{56}$, is very large and sparsely populated so that the probability of guessing a valid node key is very small.

As a brief overview of system operation (FIG. 3), consider the typical situation, wherein a source node 44 is to communicate with a destination node 40 (FIG. 3). The source node first obtains channel access by the following process:

1. The source node signals the headend (DCAM) with a network access request (no FV code attached).
2. The DCAM 10 forwards the network access request to the NAC 34, on the out of band channel 30 (no FV code required).
3. The NAC 34 transmits an encrypted channel access code (CAC) to the source node. A valid FV code relative to the NAC 34 is transmitted with the NAC message so that it can pass through the DCAM at the headend.

The source node decrypts the CAC, which is used by the source node to generate its own FV codes. The source node has thus obtained permission to utilize the requested data channel.

After the source node 44 obtains channel access, it can then establish a signal path connection with a desired destination node 40 by the following routing process:

1. The source node signals the NRM 36 (now with FV code attached). The message to the NRM 36 includes the symbolic name of the desired destination node.
2. The NRM 36 looks up the destination node name in its directory and responds with the channel frequency and address of the desired destination node. A valid FV, code, relative to the NRM 36 is transmitted with the NRM message so that it can pass through the DCAM at the headend.
3. If the channel frequency of the destination node 40 is different than that of the source node 44, the source node 40 changes its frequency to that of the destination node and repeats the above process for network access on the destination channel frequency.
4. The source node 44 then signals the destination node 40 with a session open request.
5. The destination node 40 receives the session open request, and, if necessary, obtains a channel access code by the above stated process for obtaining channel access. The destination node can then respond with a session open acknowledgement message.

At the end of this process, the source node 44 and the destination node 40 are on the same data channel thereby establishing a signal path connection between them. The two nodes 40 and 44 can continue a communication exchange until the session is terminated by appropriate messages.

Figure 5:
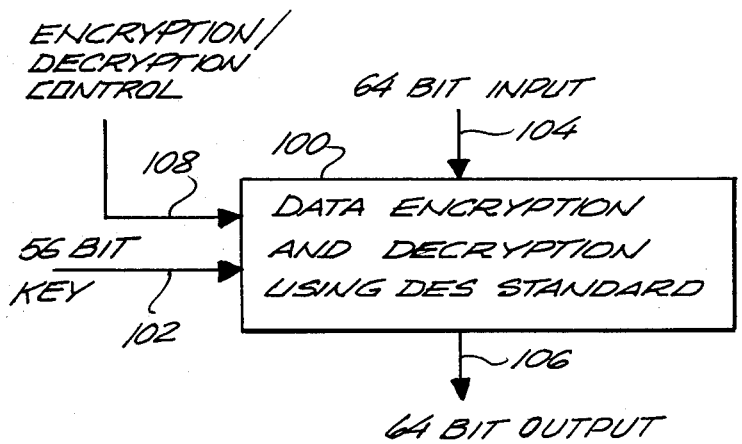
FIG. 5 is a representation of a data encryption and decryption process used in conjunction with the present invention.

In order to protect the security of channel access codes, and prevent eavesdroppers from discovering valid FV codes, a double data encryption/decryption scheme is provided. The basic data encryption used is the Data Encryption Standard (DES) adopted by the National Bureau of Standards, Washington, D.C. Briefly, as illustrated in FIG. 5, the DES scheme permits a 64 bit input 104 to be either encrypted or decrypted into a 64 bit output 106 by use of a 56 bit key 102. Control line 108 determines whether an encryption or a decryption process is taking place.

To encrypt a 64 bit input 105, the control line 108 is set for an encryption. A 56 bit key 102 is loaded into the logic 100. Then, a 64 bit input 104 is loaded into the logic, and a 64 bit output 106 of encrypted data thereafter becomes available. For decryption, the control line 108 is set for a decryption, a 56 bit key 102 is loaded into the logic 100, a 64 bit encrypted input is loaded into the logic 100, and the 64 bit output 106 is thereafter available. Standard integrated circuits are commercially available for implementing DES in hardware. However, it is anticipated that the DES encryption and decryption will be carried out in software.

Figure 6:
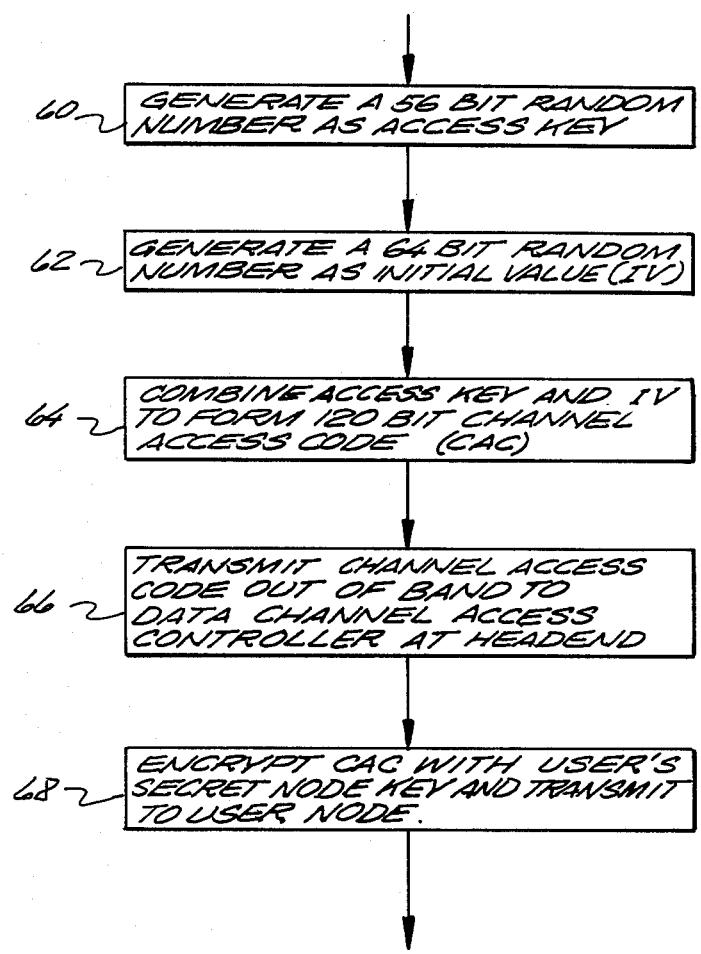
FIG. 6 is a flow chart representing a program for generating channel access codes in the network access controller in accordance with the present invention.

A flow chart representing the program in the NAC 34 (FIG. 3) for generating channel access codes (CAC) is illustrated in FIG. 6. First, a 56 bit random number called an access key is generated at step 60. Next, a 64 bit random number is generated as an initial value (IV) at step 62. The access key and the IV together form the 120 bit channel access code (CAC), as shown in step 64. The CAC is transmitted via the out of band channel to the DCAM at the headend at step 66. Furthermore, the CAC is encrypted by the NAC 34 using the user's secret node key, and transmitted to the user node at step 68.

Figure 7:
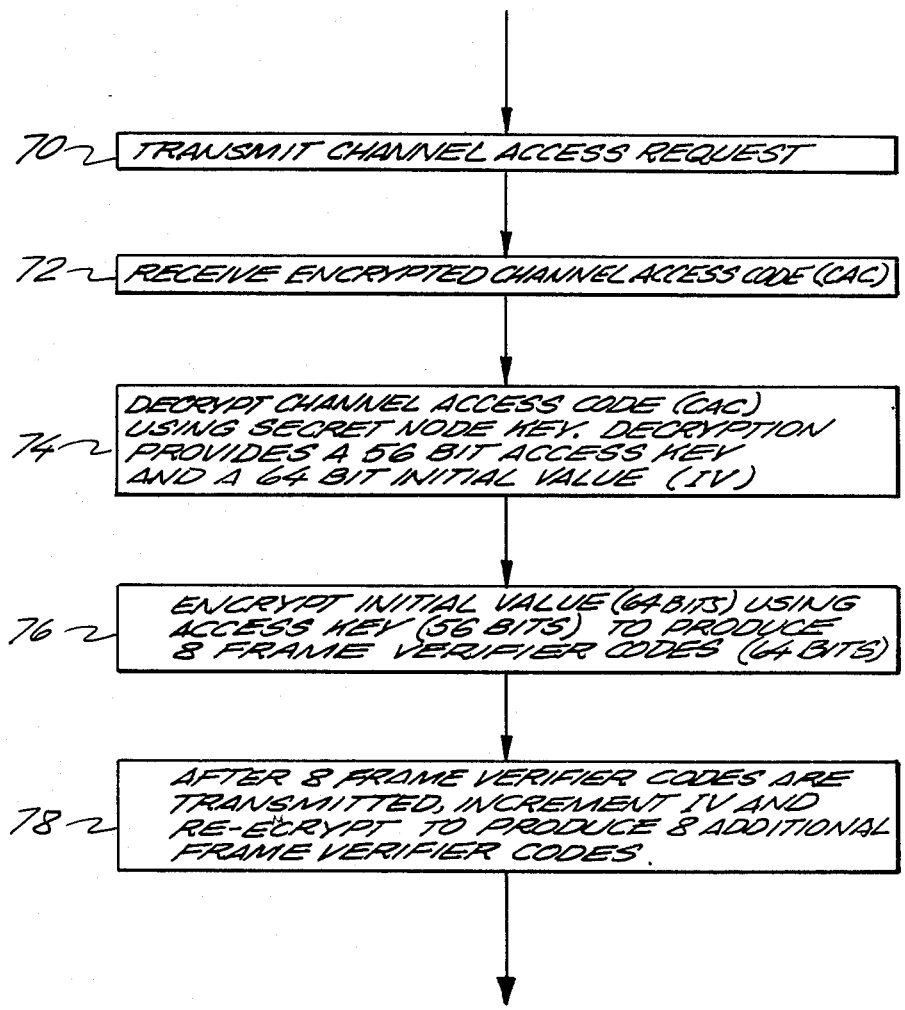
FIG. 7 is a flow chart representing a program for generating frame verifier codes in a network user node embodying the present invention.

A flow chart representing the program in a user network access unit (e.g. NAU 42 in FIG. 3) for generating frame verifier (FV) codes is illustrated in FIG. 7. First, the user NAU node that desires to obtain channel access transmits a channel access request at step 70. The channel access request is processed by the NAC which generates an encrypted CAC in accordance with the program flow chart of FIG. 6, previously described. The encrypted CAC is received at the user NAU at step 72. The user NAU decrypts the 120 bit CAC using its own secret node key as the decryption key, which provides a 56 bit access key and a 64 bit initial value (IV), at step 74. The 64 bits of IV are encrypted using the 56 bit access key to produce a 64 bit output at step 76. The latter 64 bits provide eight frame verifier codes (FV) of 8 bits each. The user NAU transmits one of these eight FV codes in each of its next eight transmitted frame messages. Each frame message also includes a frame sequence (FS) number which is incremented once for each message transmitted. After eight FV codes have been transmitted for the next eight messages, the IV code is incremented and re-encrypted using the access key to produce an additional eight FV codes to be used for the next eight consecutive frame messages.

The intended purpose of the present arrangement using FV codes based in part on frame sequence, random numbers, and a secret node key is to prevent unauthorized users from obtaining CATV communication resources, or from otherwise tempering with the network control. The FV code changes for each successive frame message. Therefore, an eavesdropper cannot re-use an FS number and an FV code known to be valid. Furthermore, the FS number is included to assure synchronization of FV codes between the transmitting node and the DCAM.

Figure 8:
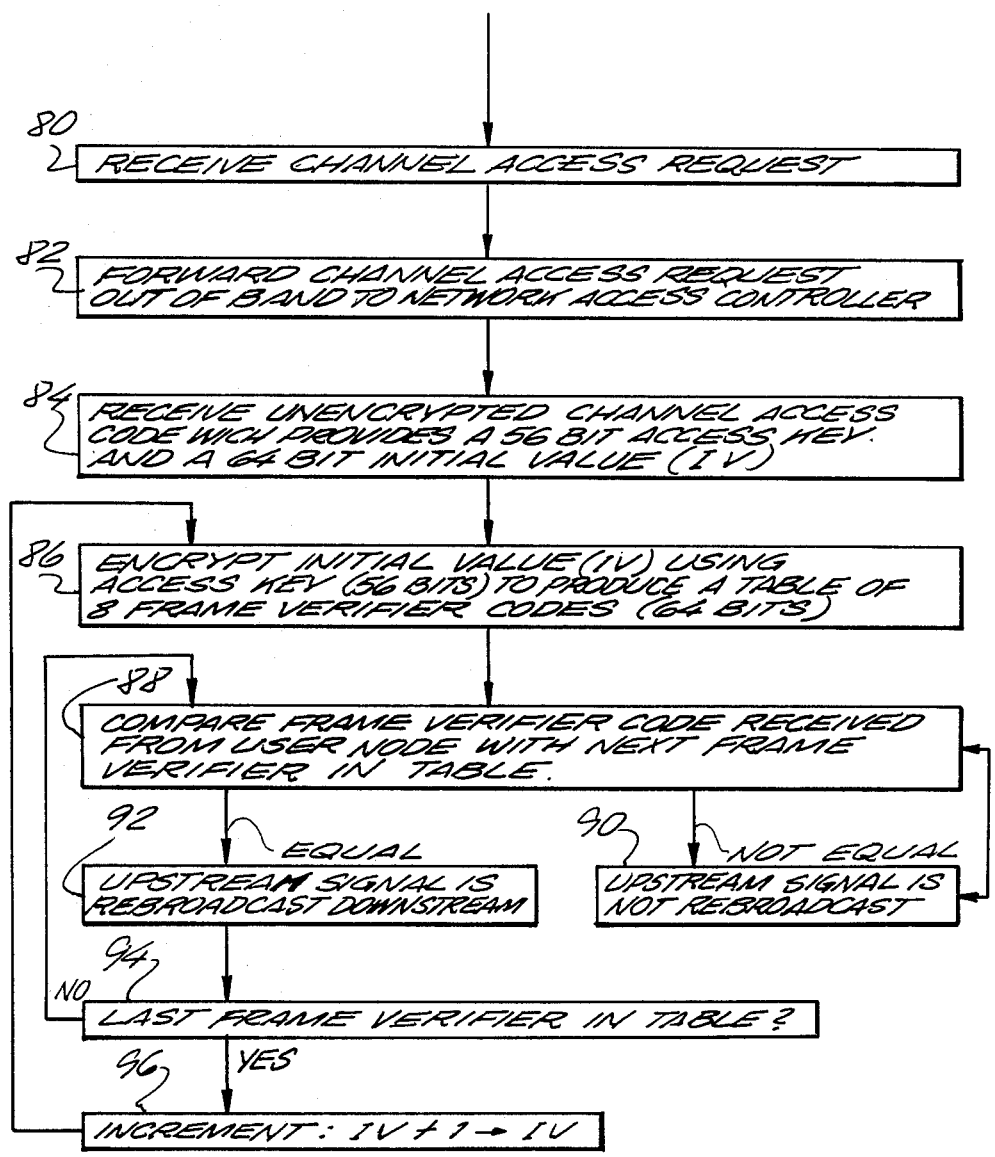
FIG. 8 is a flow chart representing a program for checking a frame verifier code in the data channel access monitor at the headend of a CATV communications system embodying the present invention.

A flow chart representing the program in the frame verifier logic 14 (FIG. 2) for checking FV codes at the headend DCAM is shown in FIG. 8. A channel access request is received at the headend at step 80. The channel access request is forwarded out of band to the NAC at step 82. The NAC responds by transmitting an unencrypted CAC out of band which is received at the DCAM at step 84. The CAC is used to encrypt the IV code with the access key (as previously described) to generate eight FV codes at step 86. A frame sequence (FS) number is associated with each of the eight FV codes.

In operation, messages are received by the DCAM at the headend which compares the received FS and FV codes with that previously calculated for the particular NAU address, at step 88. If the FS and FV codes are not equal to the previously computed FS and FV codes, the frame verifier logic 14 (FIG. 3) prevents the upstream signal from being rebroadcast downstream to the system at step 90. If the FS and FV codes are equal to the previously computed FS and FV codes, the upstream message is rebroadcast on the corresponding downstream channel frequency at step 92. After the last of the computed eight FV codes has been utilized at step 94, the IV code is incremented at step 96. The incremented value of IV is encrypted using the access key to produce a new table of eight additional FV codes at step 86.

Figure 9:
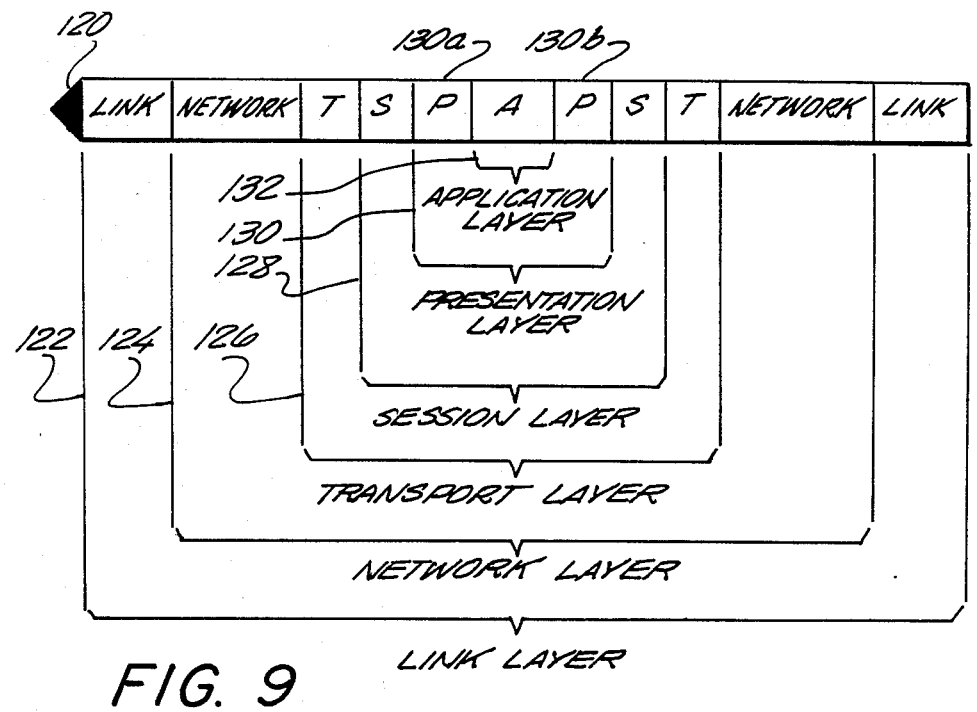
FIG. 9 is a representation of a generalized protocol architecture for use in conjunction with the present invention.

The system operation described thus far relates to establishing the basic two way signal path connection between two nodes in a CATV communication system. FIG. 9 illustrates a layered protocol architecture which also includes higher level system functions. The layered architecture of FIG. 9 closely conforms to the reference model for Open Systems Interconnection (OSI) developed by the International Standards Organization, Geneva, Switzerland.

In FIG. 9, a basic frame message 120 is transmitted through the physical medium (the CATV system) from a source node to a destination node. The frame message 120 is arranged in nested layers. Specifically, the ultimate "data to be transferred" is in the application layer 132. The application layer 132 is nested within the presentation layer 130. The presentation layer 130 is nested within the session layer 128, which is nested within the transport layer 126, and so on through the network layer 124 and the link layer 122. In general, each layer includes a header such as header 130a (which precedes the application data 132) and a trailer such as trailer 130b (which follows the application data 132). However, at any given layer, the respective header may be minimal and the respective trailer may be nonexistant.

The transmitting node (source) assembles the frame message 120 before transmission through the physical medium.

The receiving node (destination) disassembles the frame message 120 one layer at a time. First, the destination node strips the link layer from the message. The "data" of the link layer is the network layer 124. The "data" of the network layer is the transport layer 126, and so on up to the application layer. Each layer of the protocol is assigned specific system communication functions as briefly outlined below.

The link layer performs basic communication functions such as CSMA/CD control, generation and checking of error detection codes, source and destination node addressing within the same CATV system, and generation of frame verifier codes.

The network layer specifies routing instructions between the source and destination nodes located in different CATV systems. The network layer information is roughly analogous to a telephone number that informs the communication network control nodes how to route the message from the source to the ultimate destination.

The transport layer governs the data flow between the source and destination nodes once a signal path connection has been established. Typical functions of the transport layer include acknowledgement of received packets, instruction as to the maximum number of packets to be transfered, and the controlled reliable transmission of packets.

The session layer is used to initiate a communication session. In this sense, the network resource manager (NRM 36 in FIG. 3), previously discussed, is a specialized session layer entity. The functions controlled by the session layer include symbolic addressing, and determination of data channel routes from source to destination nodes.

The presentation layer controls the formatting of data for presentation to the user. For example, the source may interrogate the destination node to inquire as to whether the destination terminal has graphic display capability or only alphanumeric capability. A presentation level protocol suitable for use in conjunction with the present invention is disclosed in "Videotex Standard Presentation Level Protocol" published by the AT&T Press, May 1981.

The application layer includes the programs and information that is of service to the user. For example, in an electronic banking application, the application layer would contain the specific instructions for an electronic funds transfer.

Figure 10:
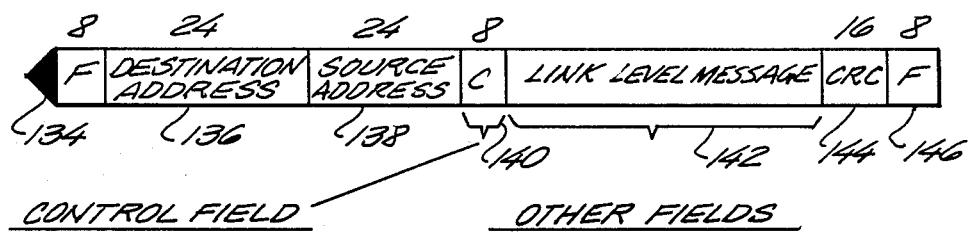
FIG. 10 llustrates the message format used in conjunction with the present invention.

FIG. 10 shows the frame format of the link layer protocol. A frame consists of an 8 bit flag 134, a 24 bit destination address 136, a 24 bit source address 138, an 8 bit control field 140, a link level message 142, a 16 bit cyclic redundancy code (CRC) 144, and an 8 bit flag 146. A CRC 144 is an error detecting code. A specific CRC suitable for use in the present system is the CCITT standard adopted by the International Telegraph and Telephone Consultive Committee, Geneva, Switzerland. The flag 134 is a synchronizing code (01111110) to indicate the start of a frame message. The destination address 136 indicates the address of the destination node. In this regard, the source and destination nodes are defined in relation to the transmitting and receiving nodes respectively.

The code in the control field 140 defines the content of the following link level message 142 which contains other defined fields. For example, the control field may specify that data is to follow. In such case, the link level message 142 would contain a frame sequence (FS) number, a frame verifier (FV) code, and data which would be used in the higher layers of the protocol architecture. The control field 140 may indicate a channel (access) request to the NAC 34 (FIG. 3), in which case the link level message 142 would contain no additional fields. The control field 140 may indicate channel relinquish command, in which case an FS number and an FV code would follow. The control field 140 may indicate a channel grant message, in which case an FS number, an FV code and an encrypted channel access code (CAC) would follow. The control field 140 may indicate that the message is a channel denial command, in which case the link level message 142 would include an FS number, an FV code, and a reason for denial of channel access. A user may be denied channel access because that user is not authorized to access CATV communication resources, or that the channel is busy due to heavy traffic.

As previously stated, the frame verifier logic 14 in the DCAM 10 (FIG. 2) checks the FV code in the frame message while rebroadcasting the frame message in real time. Thus, the FV code must be checked before the entire message is rebroadcast. The worst case timing therefore occurs when the link level message contains no data. The frame verifier logic in the DCAM has 47 bit times (the 8 bit control field plus the 8 bit FS number, plus the 8 bit FV code, plus the 16 bit CRC, plus the 8 bit flag, minus 1 bit) to compare the received FV code with the previously computed FV code. At 128 kb/s this is about 400 microseconds.

FIGS. 11a through 11f illustrate the sequence of messages exchanged between a source and destination node in order to initiate a communication session. For clarity, the message formats illustrated in FIGS. 11a through 11f illustrate only those portions of the link layer and session layer protocol necessary for the conceptual understanding of the sequence of events.

Figure 11A:
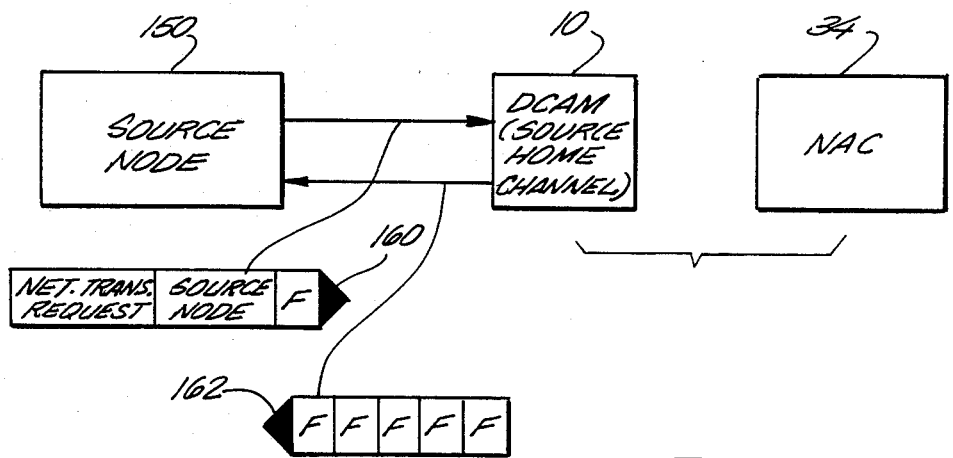
FIGS. 11a thru 11f illustrate the sequence of messages exchanged in order to initiate and terminate a communication session between a source node and a destination node in a CATV system embodying the present invention.
Figure 11B:
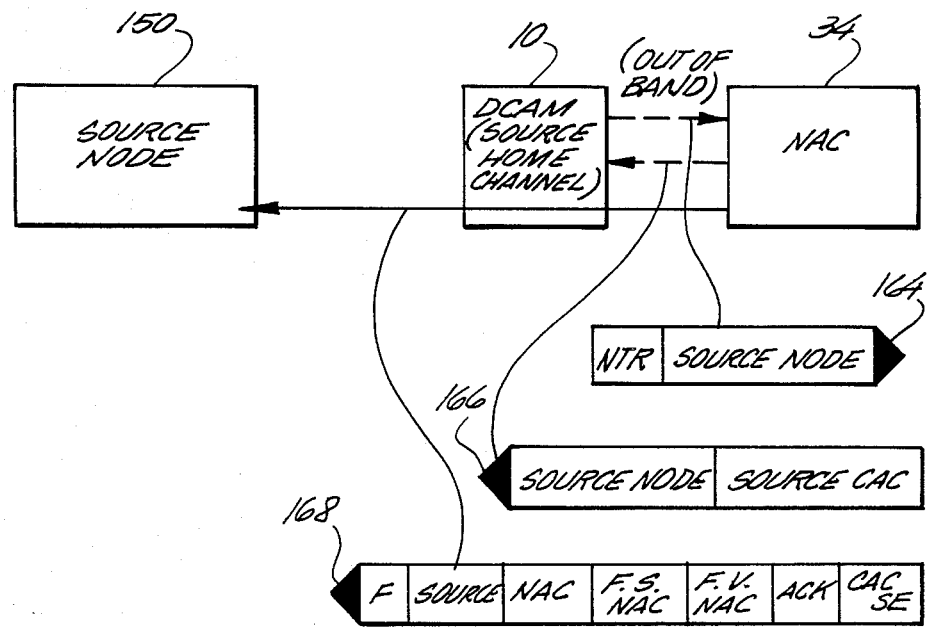
Figure 11C:
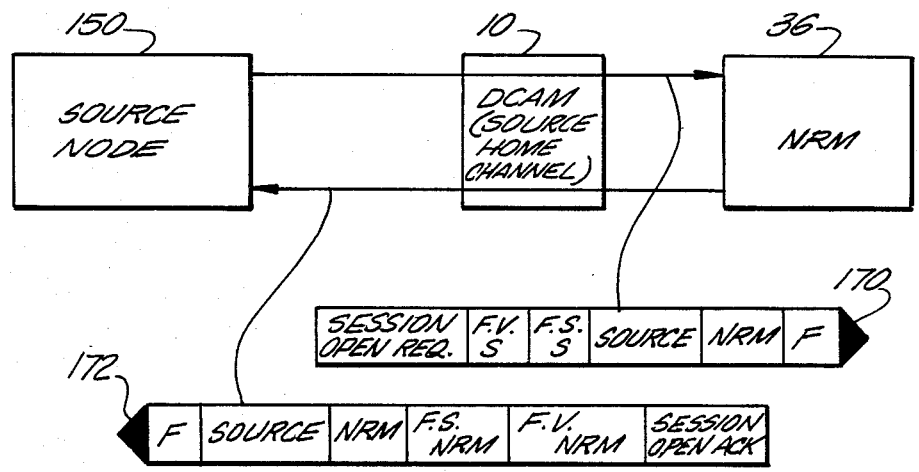
Figure 11D:
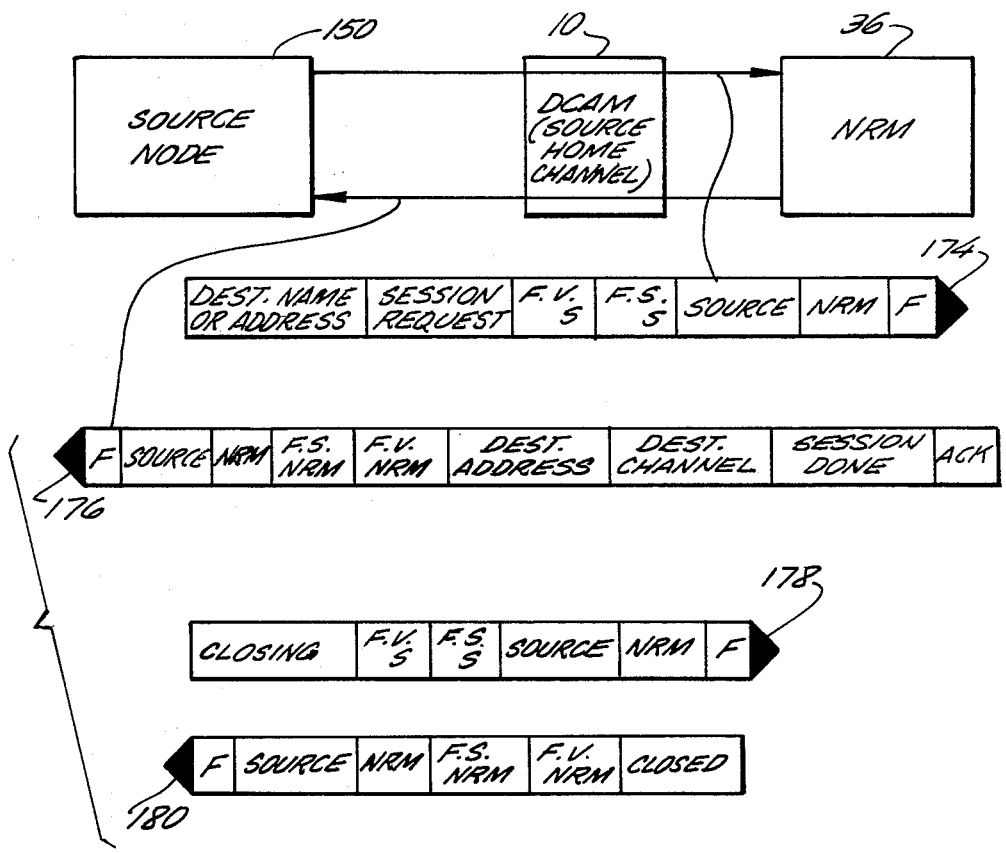
Figure 11E:
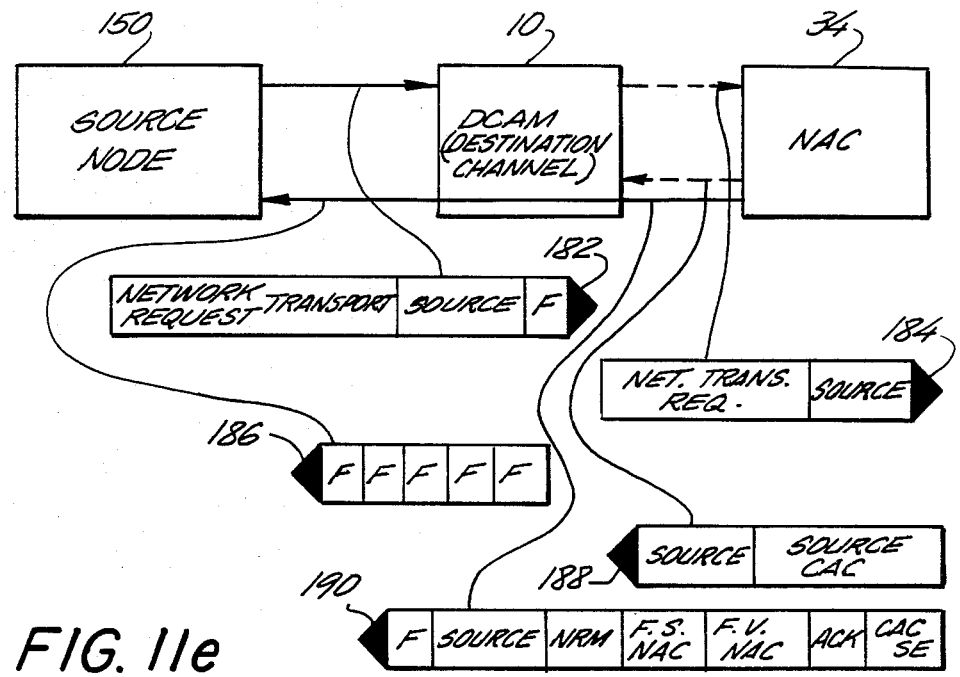
Figure 11F:
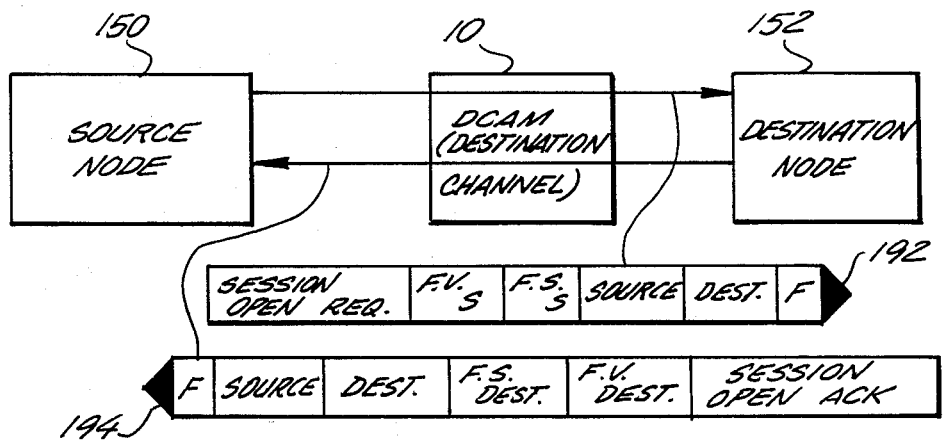

Assume that source node 150 (FIG. 11a) is to establish a communication session with destination node 152 (FIG. 11f). First, the source node transmits a network transport request message 160 to the DCAM 10 at the headend on the source home channel frequency. The message 160 consists of a flag followed by the source node address followed by a code for a network transport request. No FV code is attached. The DCAM 10 acknowledges the transport request with a message 162 consisting of a series of flags.

The source node obtains a CAC as shown in FIG. 11b. The DCAM 10 forwards the network transport request in message 164 on an out of band channel to the network access controller (NAC) 34. The NAC 34, after checking the traffic loading on the source home channel, may or may not grant access. Assuming that the NAC 34 will grant channel access to the source node 150, a message 166 is transmitted out of band back to the DCAM 10 at the headend. The latter message 166 consists of the source node address, and the unencrypted channel access code (CAC) for the source node. Also, the NAC 34 transmits to the source node 150, through the DCAM 10 on the source home channel, a message 168. The message 168 consists of a flag followed in sequence by: the source node 150 address, the NAC 34 address, the FS number for the NAC, the FV code for the NAC, an acknowledgement, and a CAC encrypted using the secret node key of the source node as the encryption key. Message 168 is rebroadcast by the DCAM 10 to the source node 150 after checking the respective FS number and FV code.

The source node 150 then opens a session with the NRM 36 as shown in FIG. 11c. First, the source node 150 transmits a message 170 consisting of a flag followed in sequence by: the address of the NRM 36, the source address, the FS number for the source node, the FV code for the source node, and a session open request. This message 170 is checked in the DCAM 10 for proper FS number and FV code and rebroadcast downstream to the NRM 36. The NRM 36 responds with an acknowledgement message 172 consisting of in sequence: a flag, the source node address, the NRM address, the FS number for the NRM 36, the FV code for the NRM 36, and a session opened acknowledgement.

After the session is opened, the source node 150 obtains the address of the desired destination node and the appropriate destination channel frequency as shown in FIG. 11d. The source node 150 transmits message 174 consisting of in sequence: a flag, the NRM 36 address, the source node address, the FS number for the source node, the FV code for the source node, the session request code, and the destination name or destination address. The NRM 36 responds (still on the source home channel) with message 176. The response message 176 consists of in sequence: a flag, the source node address, the NRM 36 address, FS number for the NRM 36, FV code for the NRM 36, the destination address, the destination channel frequency, a session done code, and an acknowledgement. A source node 150 closes the session with the NRM 36 by transmitting message 178. This latter message 178 consists of in sequence: a flag, the NRM 36 address, the source node 150 address, the FS number for the source node, the FV code for the source node, and a code for session closing. The response by the NRM 36 is message 180 consisting of in sequence: a flag, a source node address, the NRM 36 address, the FS number for the NRM 36, the FV code for the NRM 36, and a code for session closed.

The source node 150 then retunes to the frequency of the destination channel and obtains channel access authorization on the destination channel from the NAC 34 as shown in FIG. 11e. The sequence of messages in FIG. 11e is analogous to the previously described message sequence in FIGS. 12a and 12b in which channel access was obtained by the source node 150 on the source home channel. Messages 182 and 186 in FIG. 11e are analogous to messages 160 and 162 respectively in FIG. 11a. Messages 184, 188, and 190 are analogous to messages 164, 166, and 168 respectively in FIG. 11b.

The source node 150 now has channel access on the frequency of the destination node 152. The source node 150 opens a session with the destination node 152 as shown in FIG. 11f. Message 192 consists of in sequence: a flag, the destination node address, the source node address, the FS number for the source node 150, the FV code for the source node 150, and a session open request.

Assuming that the destination node 152 has previously obtained channel access, on the destination channel frequency, (by a message sequence similar to that shown in FIG. 11a, 11b, or FIG. 11e) node 152 responds with a session open acknowledgement message 194. The message 194 comprises in sequence: a flag, the source node address, the destination node address, the FV number for the destination node 152, the FV code for the destination node 152, and a code for session open acknowledgement.

At this point, the source node 150 and the destination node 152 have both been previously granted network access and are both on the same data channel frequency. The communication session of information interchange can now proceed utilizing other layers of the protocol architecture. The CATV network provides transparent data transport service between the source node 150 and the destination node 52.

After the session of information exchange is completed, the source and destination nodes 150, 152 close the session with appropriate session closed messages similar to the session closing messages 178 and 180 between the source node 150 and the NRM 36 shown in FIG. 11d.

Note that the secret node key of a respective node is never transmitted over the CATV network or the out of band data channel. Thus, an eavesdropper cannot discover the node key directly. The closest derivative of the node key that is transmitted over the CATV networks is the encrypted CAC and the following re-encrypted CAC into an FV code. The present double encryption arrangement provides security against the discovery and unauthorized use of the node key.

What is claimed is:

1. A CATV headend apparatus comprising:
    means for receiving a message from a source node, said received message including a frame verifier code;
    means coupled to said receiving means and rebroadcasting said received message in essentially real time from said CATV headend apparatus;
    means responsive to said receiving means for examining said frame verifier code and for providing an output signal which indicates whether or not said source node is authorized to utilize CATV communication resources; and
    means responsive to said output signal from said examining means for preventing said rebroadcasting means from rebroadcasting said received message if said output signal indicates that said received message including said frame verifier code is received from a source node that is not authorized to utilize CATV communication resources.

2. A communication apparatus for transmitting a message on a CATV system, said CATV system including a headend apparatus which rebroadcasts a received message including a received frame verifier code throughout said CATV system, means for examining said received frame verifier code and means for preventing rebroadcasting of at least some portion of said received message throughout said CATV system if said frame verifier code did not originate from an authorized communication apparatus, said communication apparatus comprising:
    means for storing node key data corresponding to said communication apparatus;
    means responsive to said node key data storage means for generating said frame verifier code;
    means coupled to said CATV system for transmitting said message including said frame verifier code, wherein said frame verifier code is transmitted before at least some portion of said message; and
    said means for generating said frame verifier code is further responsive to said means for transmitting said message whereby said frame verifier code generally changes for each successive transmitted message.

3. A communication apparatus according to claim 2 further comprising means for receiving an encrypted channel access code, and wherein said means for generating said frame verifier code includes,
    means for decrypting said encrypted channel access code using said node key data as a decryption key to provide an access key code and an initial value number; and
    means for encrypting said initial value number using said access key as an encryption key.

4. A communication apparatus according to claim 3 further comprising:
    means for utilizing a portion of said encrypted initial value number as said frame verifier code for each successive transmitted message;
    means for incrementing said initial value number once for every prescribed number of transmitted messages; and
    means, responsive to said means for incrementing said initial value number, for re-encrypting said incremented initial value number.

5. A CATV communication system comprising:
    a. a two way CATV system having at least one upstream data channel and at least one downstream data channel;
    b. a first communication apparatus for transmitting a message on said CATV system at a first node, said communication apparatus including means for storing data corresponding to message data to be transmitted, means for generating a frame verifier code, and means coupled to said CATV system for transmitting said message including said stored data and said frame verifier code on said upstream data channel;
    c. a CATV headend apparatus including means for receiving said transmitted message including said frame verifier code from said first communication apparatus at said first node, means coupled to said receiving means for rebroadcasting said received message in essentially real time on said downstream channel, means responsive to said receiving means which examines said frame verifier code and which indicates whether or not said first communication apparatus is authorized to utilize CATV communication resources, and means responsive to said examining means for selectively preventing said rebroadcasting means from rebroadcasting said received message on said downstream data channel if said examining means provides indication that said first communication apparatus is not authorized to utilize CATV communication resources; and
    d. a second communication apparatus at a second node of said CATV system for receiving said rebroadcast message on said downstream data channel.

6. A method for controlling access to communication resources in a CATV system including a headend apparatus and wherein said CATV system includes at least one upstream data channel and one downstream data channel, said method comprising:

receiving at said headend a serial data message on said upstream data channel;

rebroadcasting from said headend said received serial data message in essentially real time on said downstream data channel;

examining at said headend said received serial data to determine whether said serial data message originated from an authorized user; and selectively preventing at said headend the rebroadcasting of at least some portion of said received serial data message on said downstream data channel if said received serial data message did not originate from an authorized user.

7. A method for obtaining access to communication resources in a CATV communication system, said CATV system including a headend apparatus which rebroadcasts a received message including a received frame verifier code throughout said CATV system, means for examining said received frame verifier code and means for preventing rebroadcasting of at least some portion of said received message throughout said CATV system if said frame verifier code did not originate from an authorized communication apparatus, and including a network access controller, said method comprising the steps of:

transmitting a channel access request to said network access controller;

receiving an encrypted channel access code from said network access controller;

generating said frame verifier code from said received encrypted channel access code; and transmitting a message on said CATV communication system, including said frame verifier code, wherein said frame verifier code is transmitted before at least some portion of said message.

8. A method according to claim 7 wherein the step of generating said frame verifier code from said encrypted channel access code includes the steps of:

decrypting said encrypted channel access code using a secret node key corresponding to a respective user as the decryption key; and using a portion of said decrypted channel access code as an access key to encrypt another portion of said decrypted channel access code in order to form said frame verifier code.

9. A headend apparatus for controlling access to communication resources in a CATV system wherein said CATV system includes at least one upstream data channel and one downstream data channel, said headend apparatus comprising:

means at said headend for receiving a serial data message on said upstream data channel;

means coupled to said receiving means for rebroadcasting said received serial data message in essentially real time on said downstream channel;

means at said headend responsive to said receiving means for examining said received serial data message to determine whether or not said serial data message originated from an authorized user; and means at said headend responsive to said examining means for selectively preventing said rebroadcasting means from rebroadcasting at least some portion of said received serial data message on said downstream data channel if said examining means indicates that said received serial data message did not originate from an authorized user.

10. An apparatus for obtaining access to communication resources in a CATV communication system said CATV system including a headend apparatus which rebroadcasts a received message including a received frame verifier code throughout said CATV system, means for examining said received frame verifier code and means for preventing rebroadcasting of at least some portion of said received message throughout said CATV system if said frame verifier code did not originate from an authorized communication apparatus, and including a network access controller, said apparatus comprising;

means for transmitting a channel access request to said network controller;

means for receiving an encrypted channel access code from said network access controller;

means for generating said frame verifier code from said received encrypted channel access code; and means for transmitting a message on said CATV system, including said frame verifier code, wherein said frame verifier code is transmitted before at least some portion of said message.

11. An apparatus according to claim 10 wherein said means for generating said frame verifier code from said encrypted channel access code includes:

means for decrypting said encrypted channel access code using a secret node key corresponding to a respective user as the decryption key; and means for using a portion of said decrypted channel access code as an access key to encrypt another portion of said decrypted channel access code in order to form said frame verifier code.

* * * * *